US006487398B1

(12) United States Patent
Nobbe et al.

(10) Patent No.: US 6,487,398 B1
(45) Date of Patent: Nov. 26, 2002

(54) LOW NOISE ARCHITECTURE FOR A DIRECT CONVERSION TRANSMITTER

(75) Inventors: Dan Nobbe, Crystal Lake, IL (US); Dale Schwent, Schaumburg, IL (US); David P. Kovac, Vernon Hills, IL (US); Vikram Karnani, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/929,578

(22) Filed: Aug. 14, 2001

(51) Int. Cl.[7] .......................... H01Q 11/12; H04B 1/04
(52) U.S. Cl. ..................... 455/118; 455/119; 455/126; 455/127; 455/76; 375/295; 375/297; 375/298
(58) Field of Search ........................ 455/118, 119, 455/126, 69, 127, 76, 91; 330/295, 129; 375/297, 295, 296, 298, 302

(56) References Cited

U.S. PATENT DOCUMENTS

| 5,953,641 A | | 9/1999 | Auvray |
| 5,983,081 A | | 11/1999 | Lehtinen |
| 6,016,422 A | * | 1/2000 | Bartusiak ............... 455/324 |
| 6,298,093 B1 | * | 10/2001 | Genrich ................. 332/144 |
| 6,307,894 B2 | * | 10/2001 | Eidson et al. .......... 375/297 |

OTHER PUBLICATIONS

*Low Noise Dual–Band Quadrature Modulator with AGC*, RF Micro Devices RF2483, 20 pages.
*Reduced Filter Requirements using an Ultra Low Noise Modulator*, Microwave Journal www.mwjournal.com, Feb. 12, 2001, 12 pages.

* cited by examiner

Primary Examiner—Edward F. Urban
Assistant Examiner—Marceau Milord
(74) Attorney, Agent, or Firm—Shigeharu Furukawa

(57) ABSTRACT

A low noise direct conversion transmitter architecture without a post-PA filter is described. A high power/low noise differential LO (110), controlled by a near unity divide ratio PLL (112) for re-modulation protection, is coupled a polyphase quadrature generator (120) generating amplitude-balanced and phase-shifted limited differential LO signals. The quadrature mixers (130 and 132) receive the limited differential LO signals and the filtered differential baseband signals to produce up-converted differential signals. The combiner (168) receives the up-converted differential signals and combines them to produce a differential RF transmission signal. A VCA (174) amplifies the differential RF transmission signal, and the resulting differential signal is converted to a single-ended RF transmission signal through a balun (180). A linear amplifier (184) is coupled to the single-ended RF transmission signal for amplification before radio transmission by an antenna (188).

15 Claims, 3 Drawing Sheets

LOW NOISE ARCHITECTURE FOR A DIRECT CONVERSION TRANSMITTER

FIELD OF THE INVENTION

The present invention relates generally to the field of digital radio communications. More specifically, the present invention relates to a direct conversion transmitter architecture utilizing a quadrature generator system to produce low noise transmission signal.

BACKGROUND OF THE INVENTION

As a new generation of radiotelephones is introduced, it is expected that the new phone is more capable and more efficient. For example, the new phone may be able to support multiple systems and standards, which were traditionally incompatible, such as time-division-multiple-access (TDMA), code-division-multipleaccess (CDMA), and global-system for mobile (GSM), and be able to provide more talk time without increasing in size. These new radiotelephones may utilize a direct conversion architecture instead of a traditional heterodyne architecture. A direct conversion transmitter employs a local oscillator (LO) frequency that is substantially equal to the radio frequency (RF) transmission signal thereby eliminating an intermediate frequency (IF) circuit.

A direct conversion transmitter system to produce a transmission signal is generally comprised of an LO, a phase locked loop (PLL), a quadrature generator, a modulator, a power amplifier (PA), and one or more filters. The LO, coupled to the PLL, produces a signal with a frequency that is substantially equal to the frequency of a desired RF transmission signal. The quadrature generator is coupled to the LO and the modulator. It receives the signal from the LO, and produces two signal that have a phase offset of 90° relative to each other and have the same frequency as the LO. Each of the signals is fed to a mixer in the quadrature generator. Each mixer also receives a signal from the modulator, which contains the information to be transmitted. The resulting signals from the mixers now contain the information to be transmitted, and have center frequencies equal to the desired transmission frequency, but at a phase offset of 90° relative to each other. These signals are combined at the output of the quadrature generator to produce a transmission signal. The PA is coupled to the quadrature generator, and receives the transmission signal and amplifies it. The amplified signal may go through a filter to reduce noise or spurious outputs outside of the transmission band. A typical radiotelephone may employ a bandpass filter following the PA to reduce undesired noise present at the antenna in different portion of RF spectrum to meet various standards' regulations and specifications. This post-PA filter significantly reduces the undesired noise, however, it also attenuates the desired transmission signal, and it is normally large relative to the overall size of a modern radiotelephone. If the radiotelephone were designed to support multiple standards, such as TDMA, CDMA, and GSM or any combination of them that may require different sets of frequencies, the phone would be required to have multiple post-PA filters to meet each of the standards. Having multiple post-PA filters would make the phone larger and more expensive.

The post-PA filter may be eliminated by producing a RF signal at the desired frequency and power that meets the noise requirement imposed by the standard at the output of the PA. By eliminating the filter, the loss through the filter, which the PA must overcome, would be eliminated thereby increasing the overall efficiency of the transmitter. For example, if the loss after the PA were 3 dB and the desired power output were 30 dBm (or 1 Watt), then in order to overcome the loss, the PA would be required to produce 3 dB more power, or 33 dBm (or 2 Watts), at the output of the PA. One half of the power produced would have to be lost in order to reduce the undesired noise. The loss would vary depending on the requirement by the standard and the type of a filter used, however, a significant portion of the RF power produced by the PA would still be lost. By eliminating the filter after the PA, the output power requirement of the PA would be reduced. By reducing the output power requirement, the power consumption by the PA would be reduced, which would lead to a longer talk time, and a smaller and less expensive PA device might be used. By eliminating the filter, or multiple filters, and utilizing a smaller PA device, the overall size of the phone may be reduced.

Prior arts concerning the direct conversion architecture have mainly concentrated on the apparatus and method for generating quadrature signals that might be used for multiple bands and for multiple systems. However, these prior arts have not considered the noise optimization aspect of a direct conversion system for a transmitter to the level at which the post-PA filter would be unnecessary for a RF transmission signal.

The present invention describes an apparatus capable of producing a RF transmission signal for a radiotelephone low enough in noise without requiring a post-PA filter.

DETAILED DESCRIPTION OF THE PREFERRED EMBODIMENTS

Figure 1:
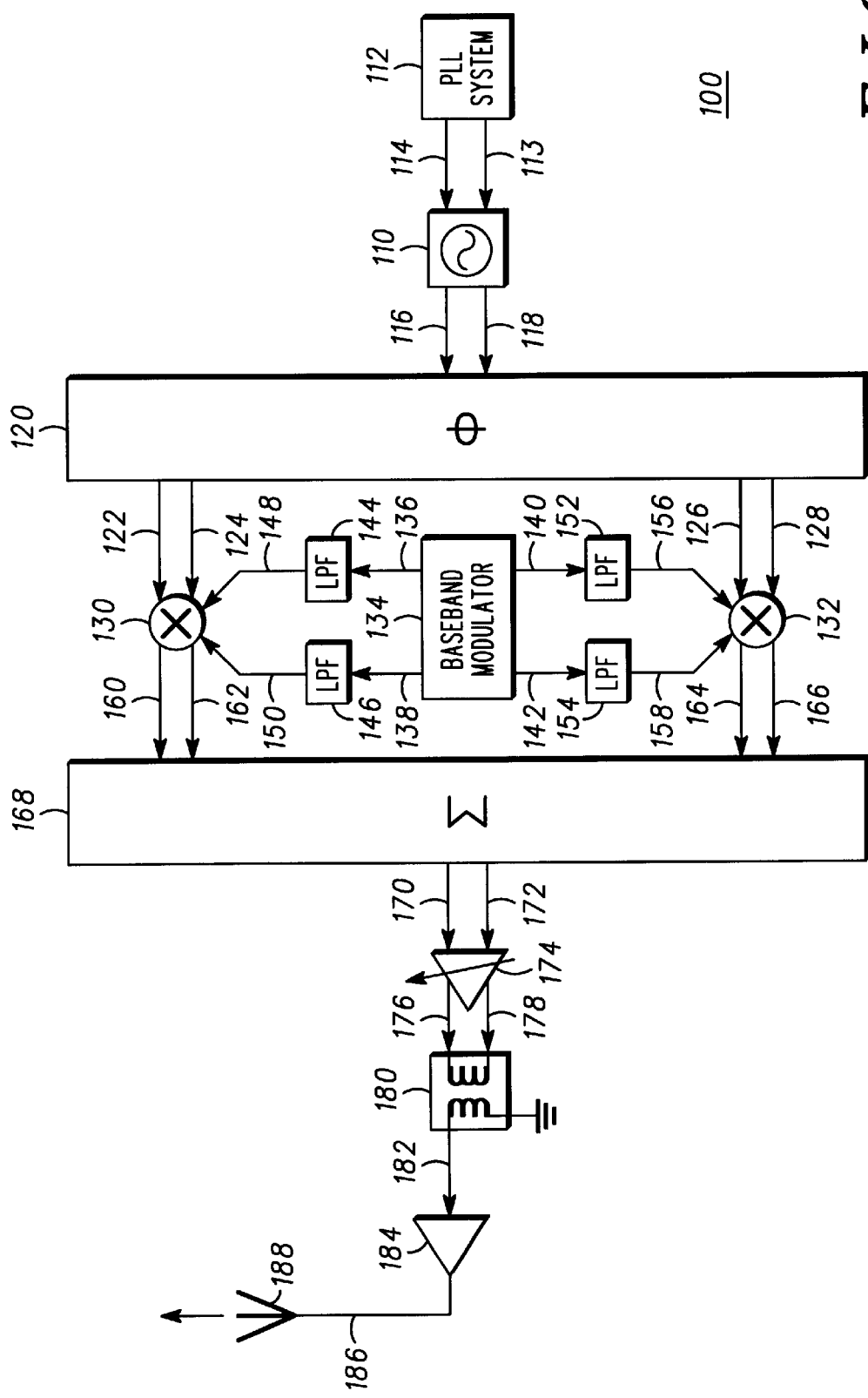
FIG. 1 is a block diagram of a preferred embodiment of a direct conversion transmitter of the present invention.

The present invention describes an apparatus capable of producing a RF transmission signal for a radiotelephone low enough in noise without requiring a post-PA cleanup filter.

An LO system produces a differential input LO signal having a frequency substantially equal to a desired RF transmission frequency. A polyphase system is coupled to receive the differential input LO signal, generating a first and a second phase-shifted differential LO signals having a frequency substantially equal to the differential input LO signal frequency but having a phase offset of a value substantially equal to ninety degrees relative to each other. A quadrature mixer system having first inputs, which are coupled to receive the first and the second phase-shifted differential LO signals, and having second inputs coupled to receive a first and a second modulated differential baseband information signals. A first mixer mixes the first phase-shifted differential LO signal with the first modulated differential baseband information signal, and a second mixer mixes the second phase-shifted differential LO signal with the second modulated differential baseband information signal. These resulting mixed signals are combined to produce the RF transmission signal.

In accordance with the present invention, the LO system is comprised of a voltage controlled oscillator (VCO) to produce an LO signal having a frequency substantially equal to a desired transmission frequency, a balun having an input coupled to the VCO receives the LO signal to produce a differential LO signal, and a differential amplifier having an input coupled the balun to receive the differential LO signal to produce a differential input LO signal.

In accordance with the present invention, the polyphase system is comprised of a first and a second buffers, a first phase shift network, a first and a second linear amplifiers, a second phase shift network, and a first and second limiting amplifiers. The first and the second buffers are coupled to receive the differential input LO signal to produce a buffered differential input LO signal. The first phase shift network is coupled to receive the buffered differential input LO signal to generate a first and a second differential LO signals having a frequency substantially equal to the differential input LO signal frequency but having a phase offset of a predetermined value relative to each other. The first and the second linear amplifiers are coupled to receive the first and the second differential LO signals, respectively, to compensate for losses encountered through the first phase shift network to produce a first and second amplified differential LO signals, respectively. The second phase shift network is coupled to receive the first and the second amplified differential LO signals to generate a first and a second phase-shifted differential LO signals, respectively, having a frequency substantially equal to the frequency of the first and the second amplified differential LO signal but having a phase offset of a value substantially equal to ninety degrees relative to each other. The first and second limiting amplifiers are coupled to receive the first and the second phase-shifted differential LO signals, respectively, to limit amplitudes of the first and the second phase-shifted differential LO signal to produce a first and a second limited differential LO signals, respectively.

In accordance with the present invention, the quadrature mixer system is comprised of a first mixer, a second mixer and a combiner. The first mixer has a first input coupled to receive the first limited differential LO signal, and has a second input coupled to receive a first filtered differential baseband signal. The first mixer mixes the first limited differential LO signal and the first filtered differential baseband signal to produce a first up-converted differential signal. The second mixer has a first input coupled to receive the second limited differential LO signal, and has a second input coupled to receive a second filtered differential baseband signal. The second mixer mixes the second limited differential LO signal and the second filtered differential baseband signal to produce a second up-converted differential signal. The combiner coupled to receive the first and the second up-converted differential signals combines the first and the second up-converted differential signals to produce a differential RF transmission signal.

FIG. 1 is an illustration in block diagram form of a direct conversion transmitter system. A differential signal scheme is utilized throughout this invention in order to suppress the carrier signal feed through. In the direct conversion transmitter system 100, an LO system 110 produces a differential input LO signal having a frequency, controlled and maintained by a PLL system 112 by way of lines 113 and 114, equal to a desired transmission frequency on lines 116 and 118. The differential input LO signal on lines 116 and 118 preferably has a high signal to noise ratio (SNR) of better than 162 dBc/Hz at 20 MHz away from the LO frequency, and preferably has a high power level of about 10 dBm. The differential input LO signal preferably has a second and lower power output level of about −10 dBm in order to extend the dynamic range and to suppress the carrier feed through due to the package or substrate isolation issue. The differential input LO signal on lines 116 and 118 is coupled to a polyphase system 120.

The polyphase system 120 produces a pair of differential signals comprised of a first limited differential LO signal on lines 122 and 124, and a second limited differential LO signal on lines 126 and 128. The first and second limited differential LO signals have the same amplitude relative to each other, and have the same frequency as the differential input LO signal but have a phase offset of about ninety degrees relative to each other. The first and second limited differential LO signals are coupled to first inputs of quadrature mixer system 130 and 132, respectively.

A baseband modulator 134 supplies a first modulated differential baseband information signal on lines 136 and 138, and a second differential baseband information signal on lines 140 and 142.

The first differential baseband information signals on lines 136 and 138 are coupled to lowpass filters 144 and 146, respectively, to produce a first filtered differential baseband signal on lines 148 and 150, respectively. The second differential baseband information signal on lines 140 and 142 are coupled to lowpass filters 152 and 154, respectively to produce a second filtered differential baseband signal on lines 156 and 158, respectively.

The first and second filtered differential baseband signals are coupled to inputs of the quadrature mixer system 130 and 132, respectively.

The first quadrature mixer 130 mixes the first limited differential LO signal and the first filtered differential baseband signal, and generates a first up-converted differential signal on lines 160 and 162. The second quadrature mixer 132 mixes the second limited differential LO signal and the second filtered differential baseband signal, and generates a second up-converted differential signal on lines 164 and 166. These first and second up-converted differential signals are coupled to a combiner 168.

The combiner 168 combines the first and the second up-converted signals to produce a differential RF transmission signal on lines 170 and 172. The differential RF transmission signal is coupled to a voltage-controlled amplifier (VCA)174.

The VCA 174 amplifies the differential RF transmission signal to produce a differential amplified RF transmission signal on lines 176 and 178. The VCA 174 has a variable gain whose value can be adjusted to meet a specific application or standards requirements. The differential amplified RF transmission signal is coupled to a balun 180.

The balun 180 converts the differential amplified RF transmission signal into a single-ended RF transmission signal on line 182. The single-ended RF transmission signal is coupled to a power amplifier (PA)184.

The PA 184 is a linear amplifier and amplifies the single-ended RF transmission signal to produce a RF transmission signal on line 186 meeting a desired power level. The RF transmission signal is coupled to an antenna 188.

The antenna 188 converts the RF transmission signal conducted by way of line 186 from the PA to a radiation signal for transmission.

Figure 2:
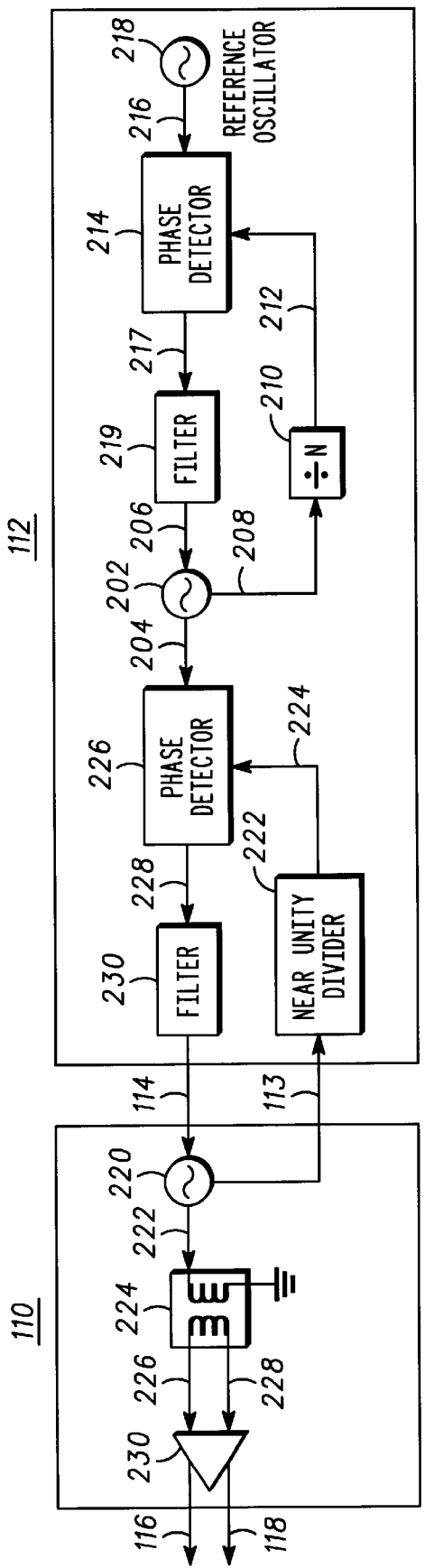
FIG. 2 is a block diagram of a LO system in accordance with the preferred embodiment of FIG. 1.

FIG. 2 is an illustration in block diagram form of the LO system 110 and the PLL system 112. A first VCO 202 produces a reference LO signal on line 204 having a frequency equal to a desired transmission frequency controlled and maintained by way of a first control signal on 206 and a first feedback signal on line 208.

The first feedback signal, which is a sample of the reference LO signal, is sent by way of line 208 to a divider circuit 210 which divides the first feedback signal by a predetermined number, and produces a divided reference LO signal on line 212. The divided reference LO signal is coupled to a first phase detector circuit 214. The first phase detector circuit also receives a reference signal, generated by a reference oscillator 218, by way of line 216. The first phase detector circuit divides the reference signal to produce a divided reference signal and compares the phase difference between the divided reference signal and the divided reference LO signal. The first phase detector circuit then produces a first DC correction signal corresponding to the phase difference on line 217. A first filter circuit 219 receives the first DC correction signal and produces the first control signal having reduced undesired noise on line 206. The first control signal is then coupled to the first VCO 202 to control and maintain the reference LO signal on line 204.

The reference LO signal is then used to control and maintain a second VCO 220 which produces an LO signal. Because the second VCO 220 produces the LO signal having the same frequency as the desired transmission frequency in a direct conversion transmitter system, when a portion of the PA output signal is coupled back to the second VCO 220 by conduction or radiation, the second VCO 220 can be re-modulated. In order to minimize the re-modulation, in the preferred embodiment, a second feedback signal, which is a sample of the LO signal, is sent by way of line 113 to a second divider circuit 222 which divides the second feedback signal by a near unity number, and produces a divided LO signal on line 224. The divided LO signal is coupled to a second phase detector circuit 226. The second phase detector circuit also receives the reference LO signal, generated by the first VCO 202, by way of line 204. The second phase detector circuit divides the reference LO signal to produce a divided reference LO signal and compares the phase difference between the divided LO signal and the divided reference LO signal. The second phase detector circuit then produces a second DC correction signal corresponding to the phase difference on line 228. A second filter circuit 230 receives the second DC correction signal and produces the second control signal having reduced undesired noise on line 114. The second control signal is then coupled to the second VCO 220 to control and maintain the LO signal on line 222.

The balun 224 is coupled to receive the LO signal and converts the LO signal that is single-ended to a differential LO signal on lines 226 and 228. The differential LO signal is coupled to a differential amplifier 230.

The differential amplifier 230 amplifies the differential LO signal and produces a differential input LO signal on lines 116 and 118. The differential input LO signal preferably has a low sideband noise ratio (SNR) of better than 162 dBc/Hz at 20 MHz away from the LO frequency, and preferably has a high power level of about 10 dBm. The differential input LO signal preferably has another power output level of about −10 dBm.

Figure 3:
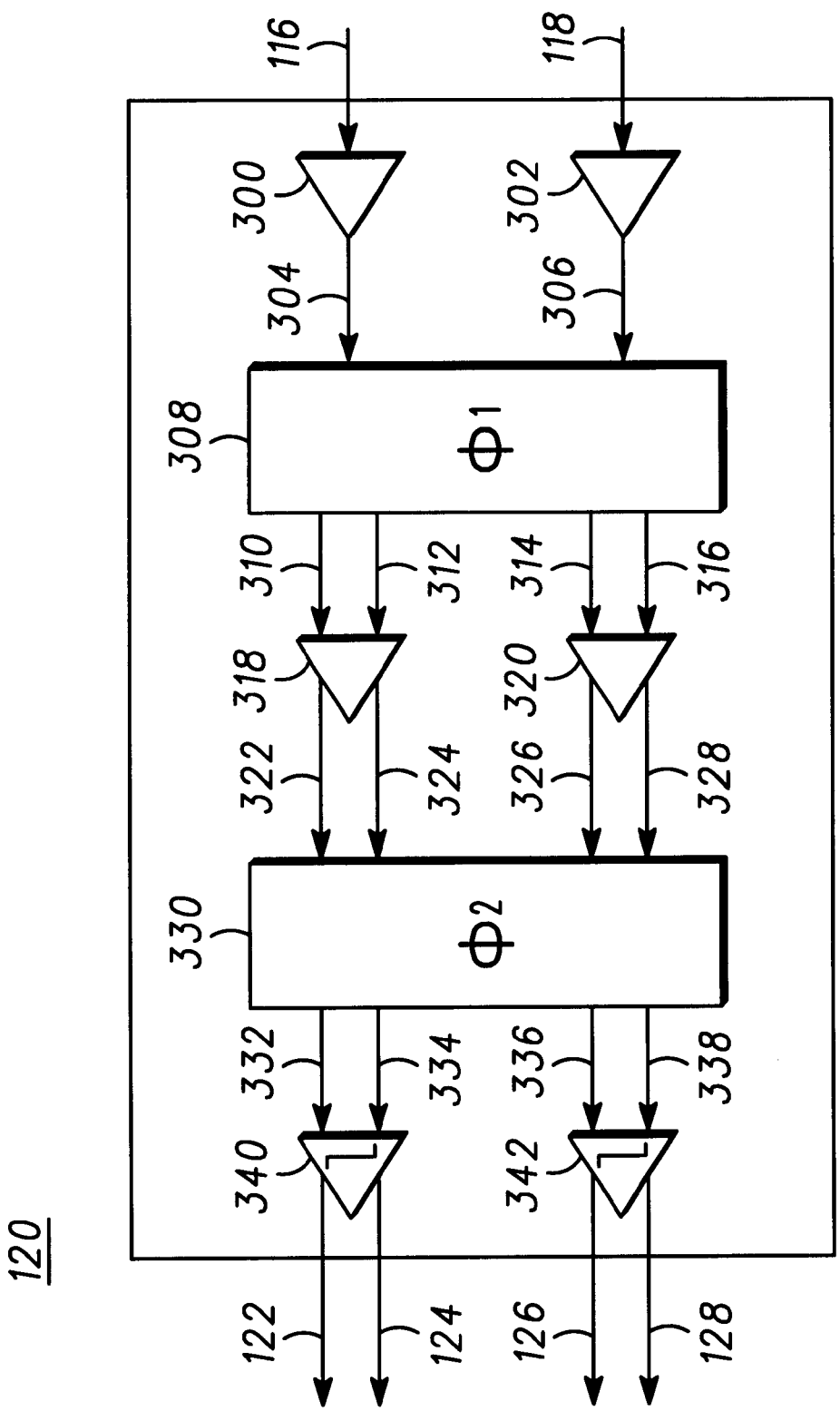
FIG. 3 is a block diagram of a polyphase system in accordance with the preferred embodiment of FIG. 1.

FIG. 3 is an illustration in block diagram form of the polyphase system 120. A first and a second buffers, 300 and 302, are coupled to receive the differential input LO signal on lines 116 and 118, and produce a buffered differential input LO signal on lines 304 and 306. A first phase shift network 308 is coupled to receive the buffered differential input LO signal on lines 304 and 306. The first phase shift network 308 generates a first and a second differential LO signals on lines 310 and 312, and on lines 314 and 316, respectively, having a frequency substantially equal to the differential input LO signal frequency but having a phase offset of a predetermined value relative to each other. The first and the second differential LO signals are coupled to a first and a second linear amplifiers 318 and 320, respectively.

The first linear amplifier 318 receives the first differential LO signal and compensates for a loss encountered through the first phase shift network 308 producing a first amplified differential LO signal on lines 322 and 324. The second linear amplifier 320 receives the second differential LO signal and compensates for a loss encountered through the first phase shift network 308 producing a second amplified differential LO signal on lines 326 and 328. The first and second amplified differential LO signals are coupled to a second phase shift network 330.

The second phase shift network 330 receives the first and the second amplified differential LO signals generating a first and a second phase-shifted differential LO signals on lines 332 and 334 and on lines 336 and 338, respectively. The first and the second phase-shifted differential LO signals have a frequency substantially equal to the frequency of the first and the second amplified differential LO signals but have a phase offset of a value substantially equal to ninety degrees relative to each other. The first and the second phase-shifted differential LO signals are coupled to a first and second limiting amplifiers 340 and 342, respectively.

The first and the second limiting amplifiers 340 and 342, receive the first and second phase-shifted differential LO signals, respectively, and limit amplitude of the first and second phase-shifted differential LO signal producing a first and a second limited differential LO signals on lines 122 and 124 and on lines 126 and 128, respectively.

In the preferred embodiment of the architecture for a direct conversion transmitter, the overall low noise is realized by taking advantage of the high power and low noise local oscillator, the polyphase implementation for the quadrature generation utilizing low noise linear amplifiers between the first and the second phase shift systems, the low noise quadrature mixers, and the low noise variable amplifier allowing gain adjustment to achieve the optimal signal to noise ratio of the RF transmission signal.

The present invention focuses on a narrow band system such as a radiotelephone for a cellular system, however, it may be used in other areas utilizing narrow or wide band system, but not limited to, a telecommunication transmission system such as a two-way pager, radiotelephone, high speed modem such as cable modem and LAN, and a cable transmission as cable TV application.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An apparatus for converting a baseband information signal directly to a radio frequency (RF) transmission signal for a direct conversion transmitter of a radiotelephone, comprising:

a local oscillator (LO) system producing a differential input LO signal having a frequency substantially equal to a desired RF transmission frequency, a polyphase system coupled to receive the differential input LO signal, generating a first and a second phase shifted differential LO signals wherein the first and the second phase shifted differential LO signals have a frequency substantially equal to the differential input LO signal frequency and having a phase offset of a value substantially equal to ninety degrees relative to each other; and a quadrature mixer system having first inputs wherein the inputs are coupled to receive the first and the second phase shifted differential LO signals, and having second inputs coupled to receive a first and a second modulated differential baseband information signals, a first mixer for mixing the first phase shifted differential LO signal with the first filtered differential baseband information signal, a second mixer for mixing the second phase shifted differential LO signal with the second filtered differential baseband information signal, and to combine resulting signals to produce the RF transmission signal.

2. The apparatus of claim 1 further comprising a phase locked loop (PLL) coupled to the LO system to control its frequency.

3. The apparatus of claim 1 further comprising a baseband modulator coupled to the quadrature mixer system.

4. The apparatus of claim 1 further comprising a voltage controlled amplifier coupled to the quadrature mixer system to amplify amplitude of the RF transmission signal.

5. The apparatus of claim 1 wherein the LO system comprising:

a voltage controlled oscillator (VCO) to produce an LO signal having a frequency substantially equal to a desired transmission frequency;

a balun having an input wherein the input is coupled the VCO to receive the LO signal to produce a differential LO signal; and a differential amplifier having an input wherein the input is coupled the balun to receive the differential LO signal to produce a differential input LO signal.

6. The apparatus of claim 1 wherein the polyphase system comprising:

a first and a second buffers coupled to receive the differential input LO signal, generating a buffered differential input LO signal;

a first phase shift network coupled to receive the buffered differential input LO signal, generating a first and a second differential LO signals wherein the first and the second differential LO signals have a frequency substantially equal to the differential input LO signal frequency and having a phase offset of a predetermined value relative to each other;

a first linear amplifier coupled to receive the first differential LO signal and to compensate for a loss encountered through the first phase shift network to produce a first amplified differential LO signal;

a second linear amplifier coupled to receive the second differential LO signal and to compensate for a loss encountered through the first phase shift network to produce a second amplified differential LO signal;

a second phase shift network coupled to receive the first and the second amplified differential LO signals, generating a first and a second phase shifted differential LO signals wherein the first and the second phase shifted differential LO signals have a frequency substantially equal to the frequency of the first and the second amplified differential LO signal and having a phase offset of a value substantially equal to ninety degrees relative to each other;

a first limiting amplifier coupled to receive the first phase shifted differential LO signal and to limit amplitude of the first phase shifted differential LO signal to produce a first limited differential LO signal; and a second limiting amplifier coupled to receive the second phase-shifted differential LO signal and to limit amplitude of the second phase shifted differential LO signal to produce a second limited differential LO signal.

7. The apparatus of claim 1 wherein the quadrature mixer system comprising:

a first mixer having a first input wherein the first input is coupled to receive the first limited differential LO signal, and having a second input wherein the second input is coupled to receive the first filtered differential baseband information signal, the first mixer for mixing the first limited differential LO signal and the first filtered differential baseband information signal to produce a first up-converted differential signal;

a second mixer having a first input wherein the first input is coupled to receive the second limited differential LO signal, and having a second input wherein the second input is coupled to receive the second filtered differential baseband information signal, the second mixer for mixing the second limited differential LO signal and the second filtered differential baseband information signal to produce a second up-converted differential signal; and a combiner coupled to receive the first and the second up-converted differential signals, the combiner for combining the first up-converted differential signal and the second up-converted differential signal to produce a differential RF transmission signal.

8. An apparatus for converting a baseband information signal directly to a radio frequency (RF) transmission signal for a direct conversion transmitter of a radiotelephone, comprising:

a voltage controlled oscillator (VCO) to produce a local oscillator (LO) signal having a frequency substantially equal to a desired transmission frequency;

a balun having an input wherein the input is coupled the VCO to receive the LO signal to produce a differential LO signal;

a differential amplifier having an input wherein the input is coupled the balun to receive the differential LO signal to produce a differential input LO signal;

a first and a second buffers coupled to receive the differential input LO signal, generating a buffered differential input LO signal;

a first phase shift network coupled to receive the buffered differential input LO signal, generating a first and a second differential LO signals wherein the first and the second differential LO signals have a frequency substantially equal to the differential input LO signal frequency and having a phase offset of a predetermined value relative to each other;

a first linear amplifier coupled to receive the first differential LO signal and to compensate for a loss encountered through the first phase shift network to produce a first amplified differential LO signal;

a second linear amplifier coupled to receive the second differential LO signal and to compensate for a loss encountered through the first phase shift network to produce a second amplified differential LO signal;

a second phase shift network coupled to receive the first and the second amplified differential LO signals, generating a first and a second phase shifted differential LO signals wherein the first and the second phase shifted differential LO signals have a frequency substantially equal to the frequency of the first and the second amplified differential LO signal and having a phase offset of a value substantially equal to ninety degrees relative to each other;

a first limiting amplifier coupled to receive the first phase shifted differential LO signal and to limit amplitude of the first phase shifted differential LO signal to produce a first limited differential LO signal;

a second limiting amplifier coupled to receive the second phase shifted differential LO signal and to limit amplitude of the second phase shifted differential LO signal to produce a second limited differential LO signal;

a first mixer having a first input wherein the first input is coupled to receive the first limited differential LO signal, and having a second input wherein the second input is coupled to receive a first filtered differential baseband information signal, the first mixer for mixing the first limited differential LO signal and the first filtered differential baseband information signal to produce a first up-converted differential signal;

a second mixer having a first input wherein the first input is coupled to receive the second limited differential LO signal, and having a second input wherein the second input is coupled to receive a second filtered differential baseband information signal, the second mixer for mixing the second limited differential LO signal and the second filtered differential baseband information signal to produce a second up-converted differential signal; and a combiner coupled to receive the first and the second up-converted differential signals, the combiner for combining the first and the second up-converted differential signals to produce a differential RF transmission signal.

9. The apparatus of claim 8 further comprising a phase locked loop (PLL) coupled to the VCO to control its frequency.

10. The apparatus of claim 8 further comprising a baseband modulator coupled to the first and second mixers.

11. The apparatus of claim 8 further comprising a voltage controlled amplifier coupled to the combiner to amplify the differential RF transmission signal amplitude.

12. An apparatus for converting a baseband information signal directly to a radio frequency (RF) transmission signal for a direct conversion transmitter of a radiotelephone, comprising:

a voltage controlled oscillator (VCO) to produce a local oscillator (LO) signal having a frequency substantially equal to a desired transmission frequency;

a phase locked loop (PLL) coupled to the VCO to control its frequency;

a balun having an input wherein the input is coupled the VCO to receive the LO signal to produce a differential LO signal;

a differential amplifier having an input wherein the input is coupled the balun to receive the differential LO signal to produce a differential input LO signal;

a first and a second buffers coupled to receive the differential input LO signal, generating a buffered differential input LO signal;

a first phase shift network coupled to receive the buffered differential input LO signal, generating a first and a second differential LO signals wherein the first and the second differential LO signals have a frequency substantially equal to the differential input LO signal frequency and having a phase offset of a predetermined value relative to each other;

a first linear amplifier coupled to receive the first differential LO signal and to compensate for a loss encountered through the first phase shift network to produce a first amplified differential LO signal;

a second linear amplifier coupled to receive the second differential LO signal and to compensate for a loss encountered through the first phase shift network to produce a second amplified differential LO signal; and a second phase shift network coupled to receive the first and the second amplified differential LO signals, generating a first and a second phase shifted differential LO signals wherein the first and the second phase shifted differential LO signals have a frequency substantially equal to the frequency of the first and the second amplified differential LO signal and having a phase offset of a value substantially equal to ninety degrees relative to each other;

a first limiting amplifier coupled to receive the first phase shifted differential LO signal and to limit amplitude of the first phase shifted differential LO signal to produce a first limited differential LO signal;

a second limiting amplifier coupled to receive the second phase shifted differential LO signal and to limit amplitude of the second phase shifted differential LO signal to produce a second limited differential LO signal;

a baseband modulator producing a first and a second filtered differential baseband information signals;

a first mixer having a first input wherein the first input is coupled to receive the first limited differential LO signal, and having a second input wherein the second input is coupled to receive the first filtered differential baseband information signal, the first mixer for mixing the first limited differential LO signal and the first filtered differential baseband information signal to produce a first up-converted differential signal;

a second mixer having a first input wherein the first input is coupled to receive the second limited differential LO signal, and having a second input wherein the second input is coupled to receive the second filtered differential baseband information signal, the second mixer for mixing the second limited differential LO signal and the second filtered differential baseband information signal to produce a second up-converted differential signal;

a combiner coupled to receive the first and the second up-converted differential signals, the combiner for combining the first and the second up-converted differential signals to produce a differential RF transmission signal; and a voltage controlled amplifier coupled to the combiner to amplify the differential RF transmission signal amplitude.

13. The apparatus of claim 12 wherein the LO signal has a power level of about 10 dBm and has a sideband noise ratio (SNR) of greater than 160 dBc/Hz measured at about 20 MHz from the LO frequency.

14. An apparatus for converting a baseband information signal directly to a radio frequency (RF) transmission signal for a direct conversion transmitter of a radiotelephone, comprising:

a voltage controlled oscillator (VCO) to produce a local oscillator (LO) signal having a frequency substantially equal to a desired transmission frequency;

a phase locked loop (PLL) coupled to the VCO to control its frequency;

a balun having an input wherein the input is coupled the VCO to receive the LO signal to produce a differential LO signal;

a differential amplifier having an input wherein the input is coupled the balun to receive the differential LO signal to produce a differential input LO signal;

a first and a second buffers coupled to receive the differential input LO signal, generating a buffered differential input LO signal;

a first phase shift network coupled to receive the buffered differential input LO signal, generating a first and a second differential LO signals wherein the first and the second differential LO signals have a frequency substantially equal to the differential input LO signal frequency and having a phase offset of a predetermined value relative to each other;

a first linear amplifier coupled to receive the first differential LO signal and to compensate for a loss encountered through the first phase shift network to produce a first amplified differential LO signal;

a second linear amplifier coupled to receive the second differential LO signal and to compensate for a loss encountered through the first phase shift network to produce a second amplified differential LO signal;

a second phase shift network coupled to receive the first and the second amplified differential LO signals, generating a first and a second phase shifted differential LO signals wherein the first and the second phase shifted differential LO signals have a frequency substantially equal to the frequency of the first and the second amplified differential LO signal and having a phase offset of a value substantially equal to ninety degrees relative to each other;

a first limiting amplifier coupled to receive the first phase shifted differential LO signal and to limit amplitude of the first phase shifted differential LO signal to produce a first limited differential LO signal;

a second limiting amplifier coupled to receive the second phase shifted differential LO signal and to limit amplitude of the second phase shifted differential LO signal to produce a second limited differential LO signal;

a baseband modulator producing a first and a second filtered differential baseband information signals;

a first mixer having a first input wherein the first input is coupled to receive the first limited differential LO signal, and having a second input wherein the second input is coupled to receive the first filtered differential baseband information signal, the first mixer for mixing the first limited differential LO signal and the first filtered differential baseband information signal to produce a first up-converted differential signal;

a second mixer having a first input wherein the first input is coupled to receive the second limited differential LO signal, and having a second input wherein the second input is coupled to receive the second filtered differential baseband information signal, the second mixer for mixing the second limited differential LO signal and the second filtered differential baseband information signal to produce a second up-converted differential signal;

a combiner coupled to receive the first and the second up-converted differential signals, the combiner for combining the first and the second up-converted differential signals to produce a differential RF transmission signal; and plurality of voltage controlled amplifiers coupled to the combiner to amplify the differential RF transmission signal amplitude.

15. The apparatus of claim 14 wherein the LO signal has a power level of about 10 dBm and has a sideband noise ratio (SNR) of greater than 160 dBc/Hz measured at about 20 MHz from the LO frequency.

* * * * *